US008659590B1

(12) United States Patent
Stam et al.

(10) Patent No.: US 8,659,590 B1
(45) Date of Patent: Feb. 25, 2014

(54) SYSTEM, METHOD, AND COMPUTER PROGRAM PRODUCT FOR MODIFYING SIGNALS OF A THREE-DIMENSIONAL GRAPHICS APPLICATION PROGRAM BASED ON A TRACKING ALGORITHM

(75) Inventors: Joseph Scott Stam, Holland, MI (US); David Patrick Luebke, Charlottesville, VA (US); David Robert Cook, San Jose, CA (US); Gerrit A. Slavenburg, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 965 days.

(21) Appl. No.: 12/336,878

(22) Filed: Dec. 17, 2008

(51) Int. Cl.
*G06T 15/00* (2011.01)
*G06T 15/20* (2011.01)
*G09G 5/00* (2006.01)
*G06F 3/00* (2006.01)
*G06F 13/00* (2006.01)
*G06F 17/00* (2006.01)

(52) U.S. Cl.
USPC ............. 345/419; 345/427; 345/619; 725/37; 463/36

(58) Field of Classification Search
USPC ......................... 345/419, 619; 725/37; 463/36
See application file for complete search history.

(56) References Cited

U.S. PATENT DOCUMENTS

| | | | |
|---|---|---|---|
| 6,890,262 B2* | 5/2005 | Oishi et al. | 463/31 |
| 7,950,003 B1* | 5/2011 | Duca et al. | 717/124 |
| 2004/0179262 A1* | 9/2004 | Harman et al. | 359/462 |
| 2005/0012749 A1* | 1/2005 | Gonzalez et al. | 345/522 |
| 2005/0059488 A1* | 3/2005 | Larsen et al. | 463/36 |
| 2005/0195165 A1* | 9/2005 | Mitchell | 345/158 |
| 2007/0035511 A1* | 2/2007 | Banerjee et al. | 345/156 |
| 2007/0164990 A1* | 7/2007 | Bjorklund et al. | 345/156 |
| 2007/0298882 A1* | 12/2007 | Marks et al. | 463/36 |
| 2010/0026710 A1* | 2/2010 | Selvanandan et al. | 345/619 |

FOREIGN PATENT DOCUMENTS

WO WO 2006126097 A2 * 11/2006

OTHER PUBLICATIONS

Foxlin et al. "WearTrack: A Self-Referenced Head and Hand Tracker for Wearable Computers and Portable VR", Proceedings of International Symposium on Wearable Computer (ISWC 2000), Oct. 16-18, 2000, Atlanta GA.*
Leyba et al. "Eye Tracking as an Aiming Device in a Computer Game", Technical Report, Clemson University, available on internet since Dec. 4, 2004.*
Tobii SDK, "Product Description: Tobii Software Development Kit" Version 2.0.1, 2005.*
Jonsson "If Looks Could Kill—An Evaluation of Eye Tracking in Computer Games", Master Thesis, at School of Computer Science and Engineering, Royal Institute of Technology 2005.*
Viola, P. et al., "Rapid Object Detection using a Boosted Cascade of Simple Features," IEEE, 2001, pp. 1-8.

(Continued)

*Primary Examiner* — Xiao M. Wu
*Assistant Examiner* — Yingchun He
(74) *Attorney, Agent, or Firm* — Zilka-Kotab, PC

(57) ABSTRACT

A system, method, and computer program product are provided for modifying signals of a three-dimensional graphics application program based on a tracking algorithm. In operation, a plurality of signals are received from a three-dimensional graphics application program. Additionally, the signals, or a derivative thereof, are modified based on an algorithm that tracks at least a portion of an upper body of a person. Furthermore, the modified signals are output.

24 Claims, 6 Drawing Sheets

(56) References Cited

OTHER PUBLICATIONS

Seeing Machines, visionary technology, Jan. 9, 2008, retrieved from http://web.archive.org/web/20080109041423/http://www.seeingmachines.com/ on Jan. 19, 2012.

TrackerIR by NaturalPoint, Jan. 10, 2006, retrieved from http://web.archive.org/web/20060110135405/http://www.naturalpoint.com/trackir/ Jan. 19, 2012.

* cited by examiner

SYSTEM, METHOD, AND COMPUTER PROGRAM PRODUCT FOR MODIFYING SIGNALS OF A THREE-DIMENSIONAL GRAPHICS APPLICATION PROGRAM BASED ON A TRACKING ALGORITHM

FIELD OF THE INVENTION

The present invention relates to graphics processing, and more particularly to adjusting rendering properties associated with three-dimensional graphics applications.

BACKGROUND

In traditional rendering systems, camera viewpoint (e.g. position, direction, etc.) is determined by a graphics application. Typically, the camera viewpoint is controlled either as a function of various inputs to the application, or by a predetermined sequence of behavior. Currently, adjusting the camera viewpoint based on external control devices requires modification of the application such that the application is capable of accepting information from these devices. There is thus a need for addressing these and/or other issues associated with the prior art.

SUMMARY

A system, method, and computer program product are provided for modifying signals of a three-dimensional graphics application program based on a tracking algorithm. In operation, a plurality of signals are received from a three-dimensional graphics application program. Additionally, the signals, or a derivative thereof, are modified based on an algorithm that tracks at least a portion of an upper body of a person. Furthermore, the modified signals are output.

DETAILED DESCRIPTION

Figure 1:
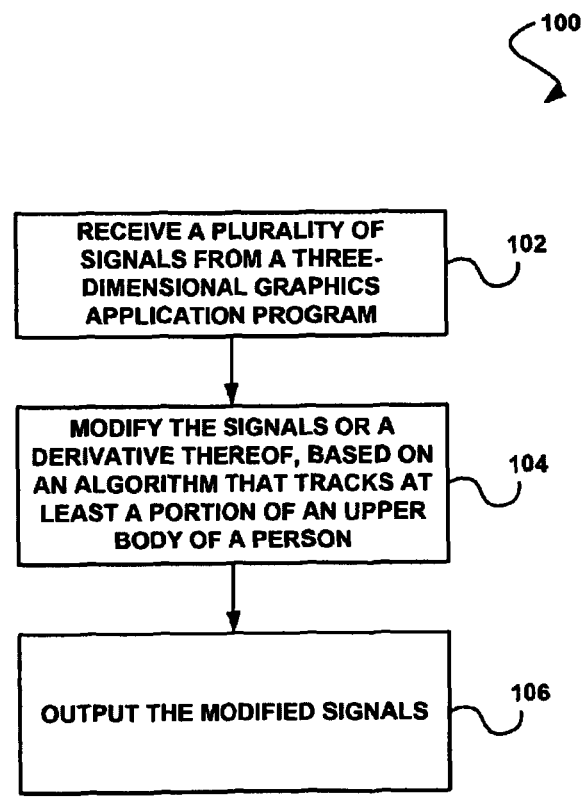
FIG. 1 shows a method for modifying signals of a three-dimensional graphics application program based on a tracking algorithm, in accordance with one embodiment.

FIG. 1 shows a method 100 for modifying signals of a three-dimensional (3D) graphics application program based on a tracking algorithm, in accordance with one embodiment. As shown, a plurality of signals are received from a three-dimensional graphics application program. See operation 102.

In the context of the present description, a three-dimensional graphics application program refers to any software application capable of creating three-dimensional computer-generated imagery. For example, in various embodiments, the three-dimensional graphics application program may include, but is not limited to, a gaming application, an instrument display application (e.g. an automotive display application, a cockpit display application, etc.), a simulation application (e.g. a flight simulation application, a medical simulation application, etc.), a Computer Aided Design (CAD) application, and/or any other three-dimensional application that meets the above definition.

Furthermore, the signals received from the three-dimensional graphics application program may include any signals received from the application that are capable of being modified. For example, in various embodiments, the signals may include commands or instructions, application program interface (API) commands (e.g. API calls, etc.), data used for image generation (e.g., vertex or texture data), derivatives of API commands (e.g. buffer signals), and/or any other signal received from the three-dimensional graphics application program. In this case, the API commands may be associated with a standard API or a custom API.

As shown further in FIG. 1, the signals, or a derivative thereof, are modified based on an algorithm that tracks at least a portion of an upper body of a person. See operation 104. In this case, the upper body of the person may include any portion of an upper body of a person. For example, in various embodiments, the portion of the upper body of the person may include a head of the person, a face of the person, shoulders of the person, at least one eye of the person, and/or any other portion of the upper body of the person. In one embodiment, the algorithm may utilize input from one or more cameras to track at least one of a head position, a body position, or an eye position of the person.

Once the signals are modified, the modified signals are output. See operation 106. In this case, the modified signals may be output such that an image or scene may be rendered and subsequently displayed. For example, an image may be generated from the outputted signals utilizing a graphics processing unit (GPU).

It should be noted that, in one embodiment, the three-dimensional graphics application program may operate independent of the algorithm used to track at least a portion of an upper body of a person. In another embodiment, the three-dimensional graphics application program may include a function of the algorithm. For example, the application may incorporate the functionality for tracking the portion of the upper body (e.g. head and/or face tracking, etc.).

In another embodiment, the application may not incorporate the functionality for tracking the portion of the upper body and the functionality may be incorporated in another non-invasive manner. For example, a 3D application may not be aware of the presence of a tracking system and thus a non-invasive implementation may be utilized. On the other hand, information from the tracking system may be fed into 3D applications that are aware of the tracking system. The algorithm used to track the portion of the upper body of the person may include any algorithm capable of tracking movement of the portion of the upper body.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
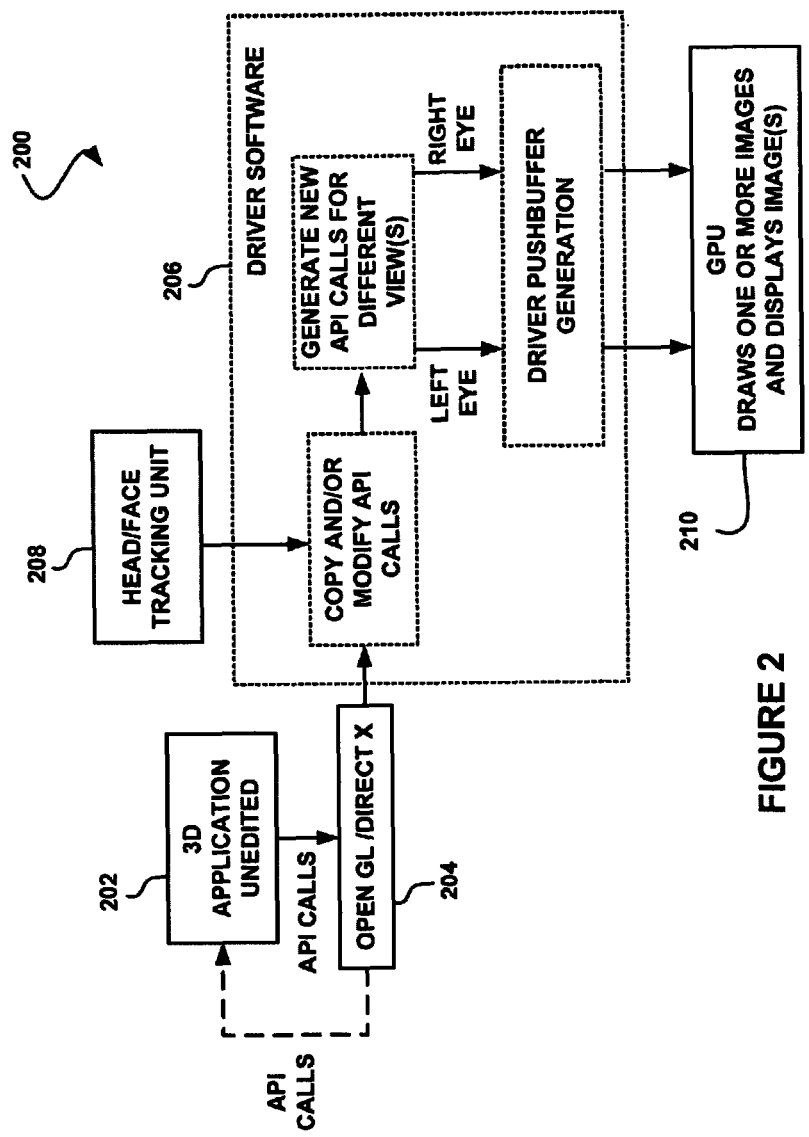
FIG. 2 shows a system flow diagram for modifying signals of a three-dimensional graphics application program based on a tracking algorithm, in accordance with one embodiment.

FIG. 2 shows a system flow diagram 200 for modifying signals of a three-dimensional graphics application program based on a tracking algorithm, in accordance with one embodiment. As an option, the present system flow diagram 200 may be implemented in the context of the details of FIG. 1. Of course, however, the system flow diagram 200 may be implemented in any desired environment. It should also be noted that the aforementioned definitions may apply during the present description.

As shown, a 3D graphics application program 202 is provided. In this case, the 3D application 202 may include any 3D application such as a game, a simulator, a virtualization program, etc. Furthermore, the 3D application 202 may include an unedited program. In other words, the 3D application 202 may include an application in a state that is unaltered from an initial functional state of the application.

In operation, the 3D application 202 issues API calls (e.g. a glVertex ( ) call, a glModelView ( ) call, etc.) to driver software 206 via an API 204. It should be noted that, although the API 204 is illustrated separate from the driver software 206, in another embodiment, the driver software 206 may include the API 204. The API 204 (e.g. an OpenGL API, a DirectX API, etc.) is operable to receive the API calls.

The driver software 206 may then duplicate the API calls and/or modify at least one of the original API calls or the duplicated API calls. New API calls may then be generated, utilizing the driver code 206, for one or more different views corresponding to the modified API calls. For example, different views may be generated for a right eye and/or for a left eye of a user. In one embodiment, this may be accomplished by modifying a glModelView ( ) API call. In this case, the glModelView ( ) API call may be modified by displacing viewpoint data associated with the API call to the left for the left eye and to the right for the right eye.

It should be noted that, in another embodiment, a single view may be generated for a left eye and a right eye. In this case, a single view may be provided and/or the driver software 206 may draw images for a plurality of eyes of different users. For example, if more than one viewer is viewing a display, two images may be generated for each of the eyes of each of the viewers.

In addition to this modification, a head and/or face tracking unit 208 may provide an input to the driver software 206 such that the driver software 206 may use this input to further modify the API calls. In this case, the modification may include displacing the data associated with the API call based on a head or face position that is tracked using an algorithm. This displacement based on the head and/or face tracking unit 208 output may be in addition to any displacement based on an eye position.

This displaced data may then be passed through the remainder of the driver software 206, including driver pushbuffer generation code. In this case, a pushbuffer refers to any collection of bits used to control hardware capable of being used to render an image. For example, the pushbuffer may refer to a sequence of commands and data, in a native format or machine language of a processor (e.g. a GPU, etc.), reflecting the steps necessary to enact a user-specified sequence of commands (e.g. a series of API commands and data, etc.).

Once the displaced data is passed through the remainder of the driver software 206, the driver software 206 may then output the modified API calls to a GPU 210, where the GPU 210 draws one or more images and displays the image(s). It should be noted that, the system flow diagram 200 may be implemented in the context of stereo rendering. In this case, the GPU may generate two images, one for each eye. Furthermore, the stereo renindg may be implemented such that it does not assume the eyes of a user are horizontal with respect to the display. For example, the face/head tracking unit 208 may detect when the head of the user is tilted to one side and this data may then be used to produce the correct stereo image with one eye higher than the other. Of course, the system flow diagram 200 may be implemented in contexts other than stereo rendering.

In some rendering systems, camera viewpoint (e.g. position, direction, etc.) is determined by a graphics application and is controlled either as a function of inputs into the application, or by a predetermined sequence of behavior. However, modifying rendering properties based upon tracking a viewpoint of a user is often desired. For example, if a head position and a viewing direction of the user can be determined, it may be desired to adjust the rendering parameters of the application to reflect this information. Specifically, it may be desired to adjust the camera viewpoint position and direction to provide a modification to the resulting scene corresponding to the change in a view of the user.

Some techniques for determining the current position and gaze direction of a user include processing of a camera image of the user, processing of a stereo (e.g. a dual-camera, etc.) view of the user, tracking of multiple emitting light sources attached to the users head, and various electro-mechanical tracking methods. In order to implement a user-view dependent rendering system using these techniques, an application must be modified to include the information from the tracking system and the application must adjust the rendering commands appropriately.

As a result, only a very small number of applications have been developed to incorporate such techniques. In general, these applications have been limited to professional simulation systems or a few open-source games. By modifying the API commands from an application, the rendering properties of an application may be modified based upon tracking a viewpoint of a user, without the need to modify the application. It should be noted that any tracking system may be utilized for tracking the viewpoint of the user. For example, such tracking system may include a commercially available tracking system or a custom designed tracking system.

Figure 3A:
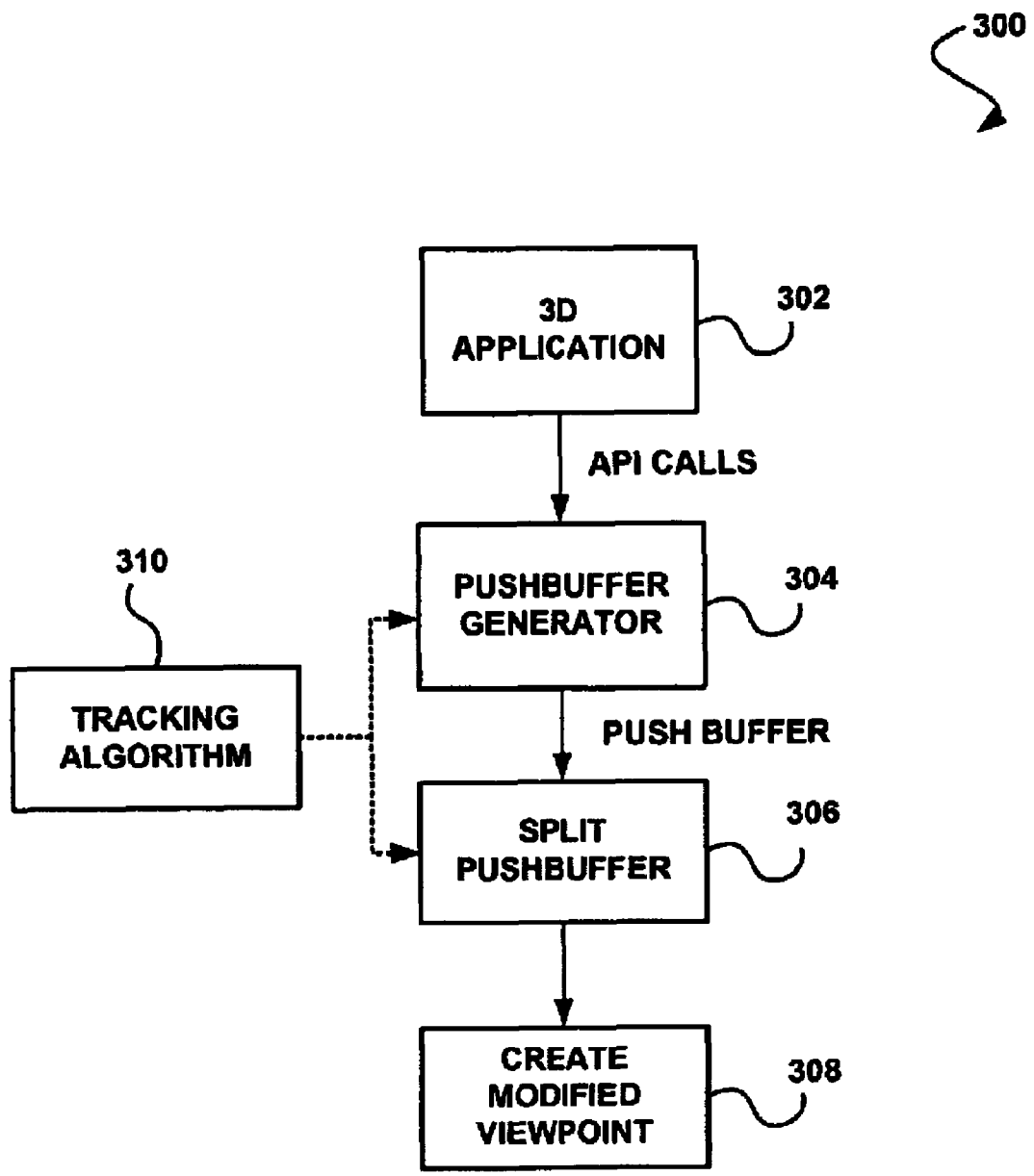
FIG. 3A shows a system for modifying signals of a three-dimensional graphics application program based on a tracking algorithm, in accordance with one embodiment.

FIG. 3A shows a system 300 for modifying signals of a three-dimensional graphics application program based on a tracking algorithm, in accordance with one embodiment. As an option, the present system 300 may be implemented in the context of the functionality and architecture of FIGS. 1-2. Of course, however, the system 300 may be implemented in any desired environment. Again, the aforementioned definitions may apply during the present description.

As shown, a 3D application 302 is provided. The 3D application 302 generates API calls and sends the commands to a driver including a pushbuffer generator 304. Using the API calls, the pushbuffer generator 304 generates at least one pushbuffer. In this case, a pushbuffer refers to any collection of bits used to control hardware capable of being used to render an image. The generated pushbuffer may then be split using a split pushbuffer code module 306 included in the driver. The split pushbuffer may then be used to create a modified viewpoint 308 (e.g. a left and right view, etc.).

A tracking algorithm 310 may interface with the pushbuffer generator 304 and/or the split pushbuffer code module 306 to control modification of the signals. It should be noted that, in various embodiments, the API command stream may be modified before pushbuffer creation, or the pushbuffer may be modified directly after creation. For example, the push buffer may be modified directly utilizing the hardware or driver software. Moreover, the modification may be performed at any intermediate representation created by the driver software.

In this way, the 3D application 302 may produce a series of unmodified commands. Between the issuing of these commands and the rendering of an image based on the commands, the commands are modified to include data provided by another source (e.g. a head/face tracking unit, a gaming chair, etc.). For example, the commands may be modified before a pushbuffer generation or after a pushbuffer generation. In the case that a derivative of the signals is modified, the derivative of the signals may include pushbuffer signals. It should be noted that this modification may be performed using driver software (e.g. computer code embodied on a computer readable medium, etc.) and/or hardware (e.g. a graphics processor, hardware associated with a GPU etc.).

In one embodiment, the modification to the rendering position reflected by the API commands may be performed in a video driver rather than at the application level. Thus, existing 3D applications (e.g. video games, etc.) may benefit from view-dependent rendering by simply using a new video driver that intercepts and modifies the rendering parameters specified by the application to achieve the modified rendering view. In the context of the present description, view-dependent rendering refers to any rendering of a 3D scene from a perspective viewpoint calculated as a function of the detected position and/or orientation of an end users head, body, and/or eyes.

Additionally, any image processing computations necessary to track the face may be performed on a graphics card using the GPU. In many cases, a GPU is more suitable for performing the types of computations needed for head/face tracking. Furthermore, using the GPU for this processing may reduce the load on a CPU. Results of the GPU processing may be directly incorporated into subsequent rendering computations.

In one embodiment, 3D stereo rendering may be used in conjunction with the rendering parameter modification. For example, the modified signal may be processed for stereoscopic display. In 3D stereo rendering, a given 3D scene may be rendered from two slightly offset viewpoints rather than the single viewpoint traditionally used. The two rendering viewpoints of the scene are then shown to each eye of a user independently through the use of shutter glasses or another mechanism.

3D stereo rendering of many existing applications may be accomplished by intercepting the application-specified rendering camera viewpoint and adding a second displaced viewpoint, optionally displacing the original application-specified viewpoint as well. By intercepting the application-specified viewpoint at the graphics driver level, existing software may be used with 3D stereo vision without modification of the software application.

A similar approach may also be utilized to achieve the user-view dependent rendering. For example, a head position and gaze direction of a user may be determined. This information may then be used by the video driver to offset the application specified rendering parameters. In this way, an existing software application may specify a rendering camera point and position and direction of this camera viewpoint may be modified based upon the results of head/face tracking algorithms to incorporate the effect of a view of a user. Next, this single modified viewpoint may be offset to create a second viewpoint for 3D stereo rendering. It should be noted that any combination of stereo-rendering and view-dependent rendering may be implemented. Furthermore, any combination of upper body tracking (e.g. eye tracking, head tracking, body tracking, etc.) may be utilized.

In many cases, head/face tracking algorithms and associated hardware must consider the variations in head size, skin color, eye shape, etc. which occur between users. In one embodiment, using 3D stereo rendering and view-dependent rendering in combination can alleviate some of this variability by using one or more standard configurations for 3D stereo shutter or polarizer glasses. 3D glasses may be manufactured in standard sizes and have a variety of predetermined markings or even emissive features. Since these sizes and features are predetermined, they can be tracked much more robustly by the face tracking system and may result in a lower computational overhead.

In one embodiment, gesture based control of an application may be provided utilizing the driver software. In this case, the gesture based control of the application may be provided through the same camera and image processing pipeline used for head/face tracking. For example, an open or closed eye may be detected through visual processing (e.g. utilizing commercial products such as Seeing Machines FaceLab®, etc.).

Many games (e.g. first-person-shooter games, etc.) allow the selection of objects based on particular user actions, which currently involve pressing a key to switch modes. For example, in a first-person-shooter game, using a weapon in standard mode or "sniper" mode may simulate looking through aiming-sites of a weapon. In this case, the gesture of the user briefly closing an eye may be identified as a trigger to switch to and from a "sniper" mode use of a weapon. This may be a less tedious and more natural technique for switching modes as opposed to pressing a key to switch modes.

Similarly, in a gaming context, rapid head-nods may be used to move up or down, either in a particular view or by character motion. In another case, quick jolts of a head to the left and right may indicate the need to dodge, etc. In these cases, the number of gestures may be recognized as part of the tracking system algorithm. The tracking system may then emulate an assigned key-press (e.g. mouse movement, etc.) associated with each gesture to achieve the desired behavior. By assigning gestures to emulate key-presses behaviors already specified in an existing game or other application, these gestures may be used without the need to modify the existing application.

In yet another embodiment, a resulting camera viewpoint may be tracked over time for control of external hardware for simulation. In this case, either the original application generated viewpoint or the viewpoint as modified based on user view detection may be tracked. For example, advanced gaming chairs (e.g. D-BOX Motion Code™ home gaining systems, etc.) may be used to provide motion feedback based on viewpoint motion for increased realism in a game. Thus, tracking may be performed in the driver such that these features may be added to existing applications (e.g. games, etc.) without modification.

Currently, motion instructions needed to actuate hardware such as gaming chairs must be created as part of the development of the software application. However, by tracking the location of the camera viewpoint over time, the movement of a user may be calculated within a virtual 3D environment. Motion feedback consistent with this motion may then be provided.

For example, if the camera viewpoint is moved suddenly left or right, a motion chair may be jolted left or right. If the camera viewpoint is following a wide arc (e.g. as experienced in a driving simulation, etc.), a motion chair may be tilted in the appropriate direction. Additionally, vibration or shaking of the camera viewpoint representing a crash or concussion of some type may result in shaking of the motion chair.

In still another embodiment, view-dependent rendering may be implemented in the context of automotive applications. Face tracking and eye behavior detection may be utilized to monitor an attention of a driver to alert a sleeping or distracted driver. In another case, a reconfigurable instrument cluster that uses a display and graphics processor to replace traditional mechanical gauges used for speedometers, fuel gauges, etc. may implement view-dependent rendering techniques.

For example, a certain aesthetic realism is desired in a graphical display as instrument clusters are an important ornamental feature of an automobile. Thus, in one embodiment, a vehicle may be equipped with both a driver face-tracking system and a graphical instrument cluster such that the view-dependent rendering may be applied to rendering the instrument cluster. In this case, changes in the rendering parameters may include subtle variances in the camera angles, shadows, and lighting to provide dramatic increases in realism without causing a distraction.

These subtle variations in rendering parameters may be created, based upon the drivers head movement, for a graphical instrument cluster to increase realism and aesthetic quality. It should be noted that various combinations of user face position and direction detection, 3D stereo rendering, gesture recognition, and auxiliary motion simulation may be implemented to create a numerous effects for a wide variety of software applications.

Figure 3B:
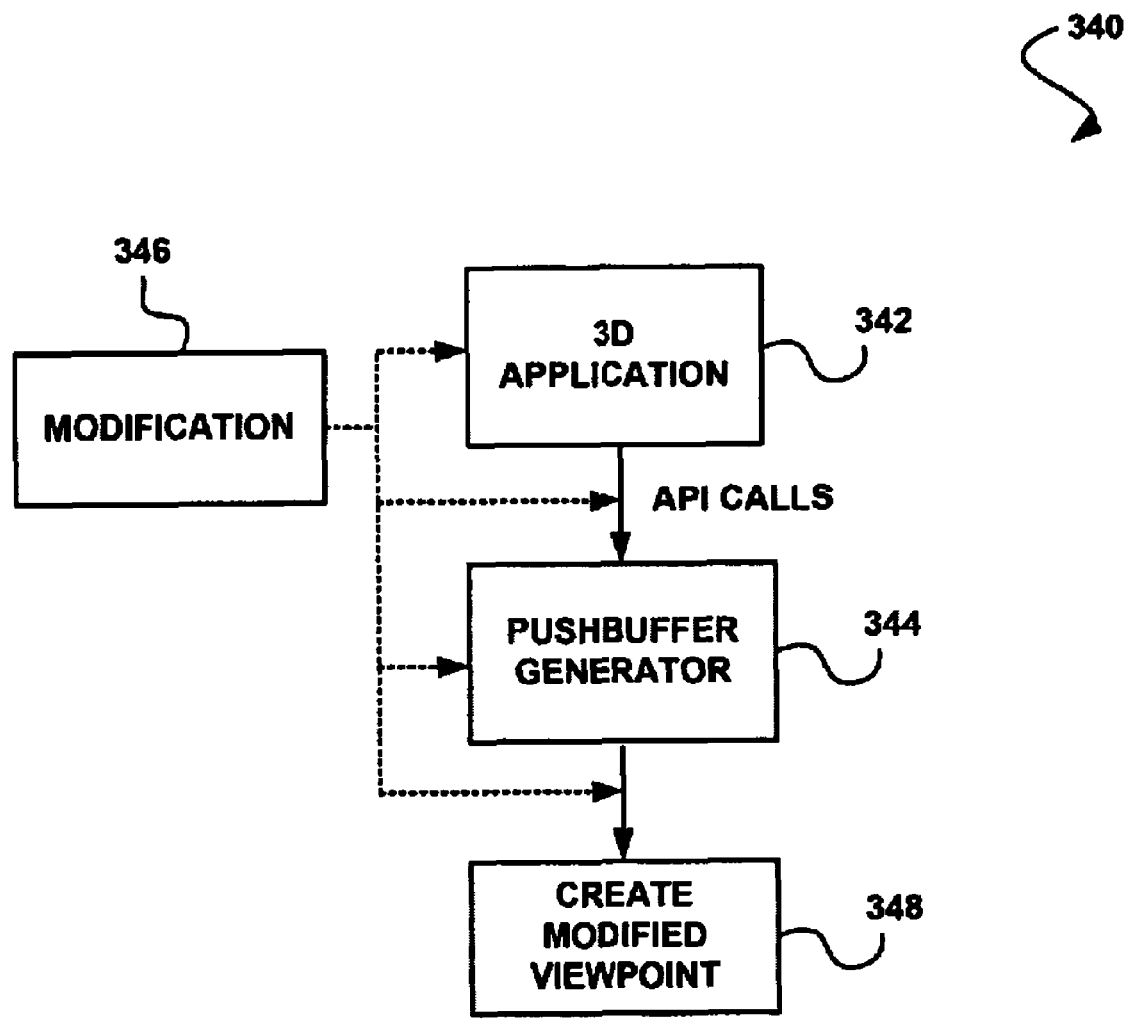
FIG. 3B shows a system for modifying signals of a three-dimensional graphics application program based on a tracking algorithm, in accordance with another embodiment.

FIG. 3B shows a system 340 for modifying signals of a three-dimensional graphics application program based on a tracking algorithm, in accordance with another embodiment. As an option, the present system 340 may be implemented in the context of the functionality and architecture of FIGS. 1-3A. Of course, however, the system 340 may be implemented in any desired environment. The aforementioned definitions may apply during the present description.

As shown, a 3D application 342 is provided. The 3D application 342 generates API calls and sends the commands to a driver including a pushbuffer generator 344. Using the API calls, the pushbuffer generator 344 generates at least one pushbuffer. Signals from the 3D application 342, or a derivative thereof, are modified in a modification operation 346 based on an algorithm that tracks at least a portion of an upper body of a person.

As shown further, the modification 346 may be performed at the API level, at the pushbuffer level, or at any intermediate processing level created by driver software. A tracking algorithm may interface with the pushbuffer generator 344 or with any other level where the modification occurs, to control modification of the signals. A modified viewpoint 348 may then be created.

Figure 4:
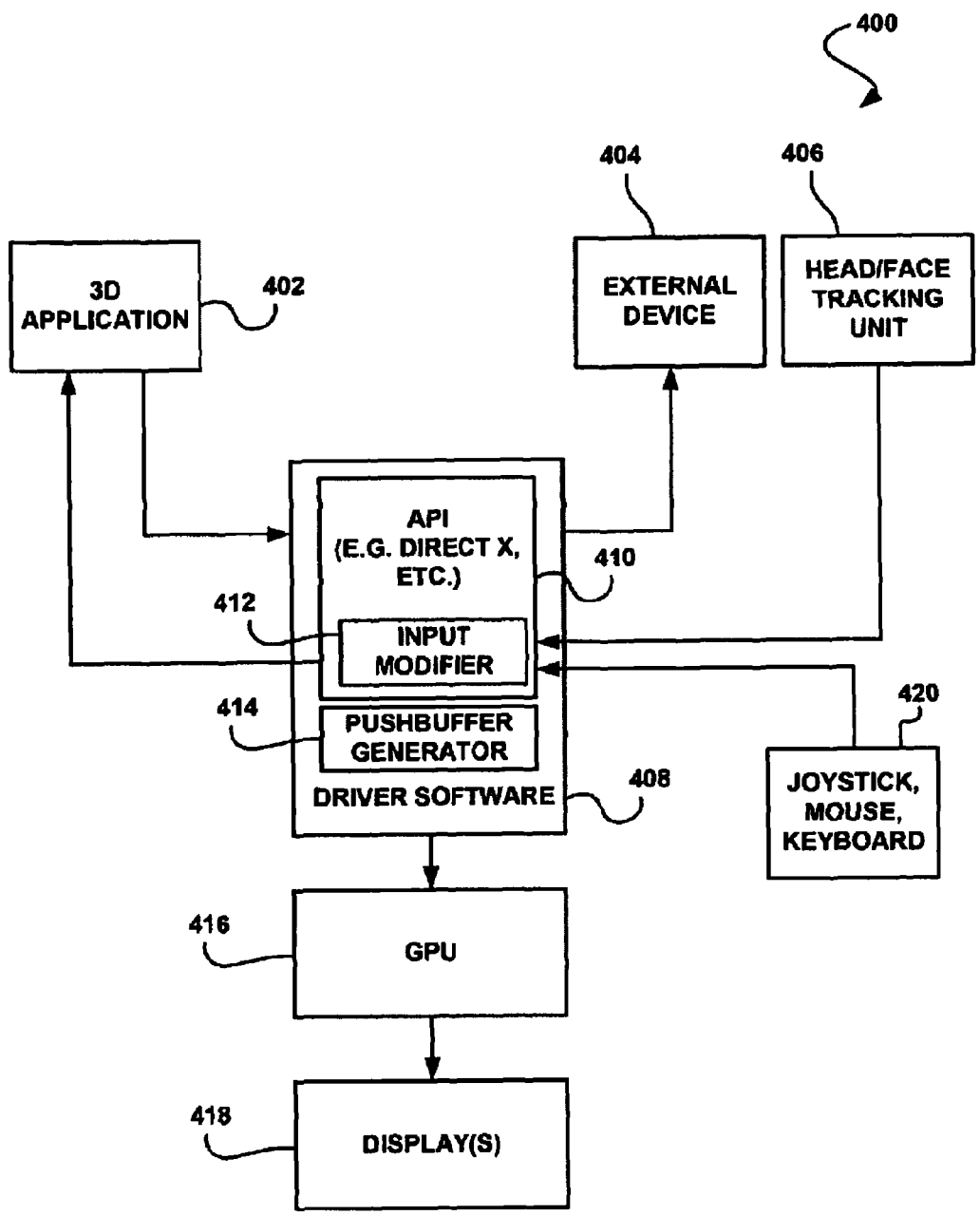
FIG. 4 shows a system for modifying signals of a three-dimensional graphics application program based on a tracking algorithm, in accordance with another embodiment.

FIG. 4 shows a system 400 for modifying signals of a three-dimensional graphics application program based on a tracking algorithm, in accordance with another embodiment. As an option, the present system 400 may be implemented in the context of the functionality and architecture of FIGS. 1-3B. Of course, however, the system 400 may be implemented in any desired environment. Further, the aforementioned definitions may apply during the present description.

As shown, a 3D application 402 is provided. In operation, the 3D application 402 generates and communicates API calls to driver software 408 via an API 410 included as part of the driver software 408. Additionally, the driver software 408 is capable of communicating information to the 3D application 402, such as data provided by one or more input devices (e.g. a mouse, a keyboard, etc.). In one embodiment, this data may be communicated from an input modifier module 412 that is included in the driver software 408.

Once the API calls are received by the driver software 408, the API calls may be modified by information provided by devices such as a head/face tracking unit 406, another input device such as a joystick, mouse, and keyboard 420, etc., and/or by tracking algorithms associated therewith. In one embodiment, the API calls may be modified utilizing the input modifier module 412 and one or more pushbuffers may be generated utilizing a pushbuffer generation module 414 included in the driver software 408. Data in the pushbuffer may be communicated to a GPU 416 for rendering one or more images for display on one or more displays 418.

In addition to modifying the API calls, generating a pushbuffer, and communicating the pushbuffer data to the GPU 416, the API calls may also be communicated to one or more external devices 404. In this case, the external devices 404 may include any device capable of receiving control commands. For example, in one embodiment, the external device 404 may include a gaming chair.

In various embodiments, either modified or unmodified commands may be sent to the external device 404. For example, if the 3D application 402 supports the use of the external device 404, unmodified commands may be sent to the external device 404. On the other hand, if the 3D application 402 does not support the use of the external device 404, modified commands may be sent to the external device 404.

In this way, external devices (e.g. gaming chairs, etc.) may be utilized with applications not specifically designed for the use of such devices. By modifying the API calls from the 3D application 402 utilizing the driver software 408, the external device 404 may be utilized with the 3D application 402 without modifying the 3D application 402.

As an option, the modified signals may also be fed back to the 3D application 402. In this case, the modified signals may be fed back to the 3D graphics application 402 for controlling the output of the 3D application 402. For example, the output may be controlled as a function of gestures of the user (e.g. facial gestures, head gestures, etc.).

Figure 5:
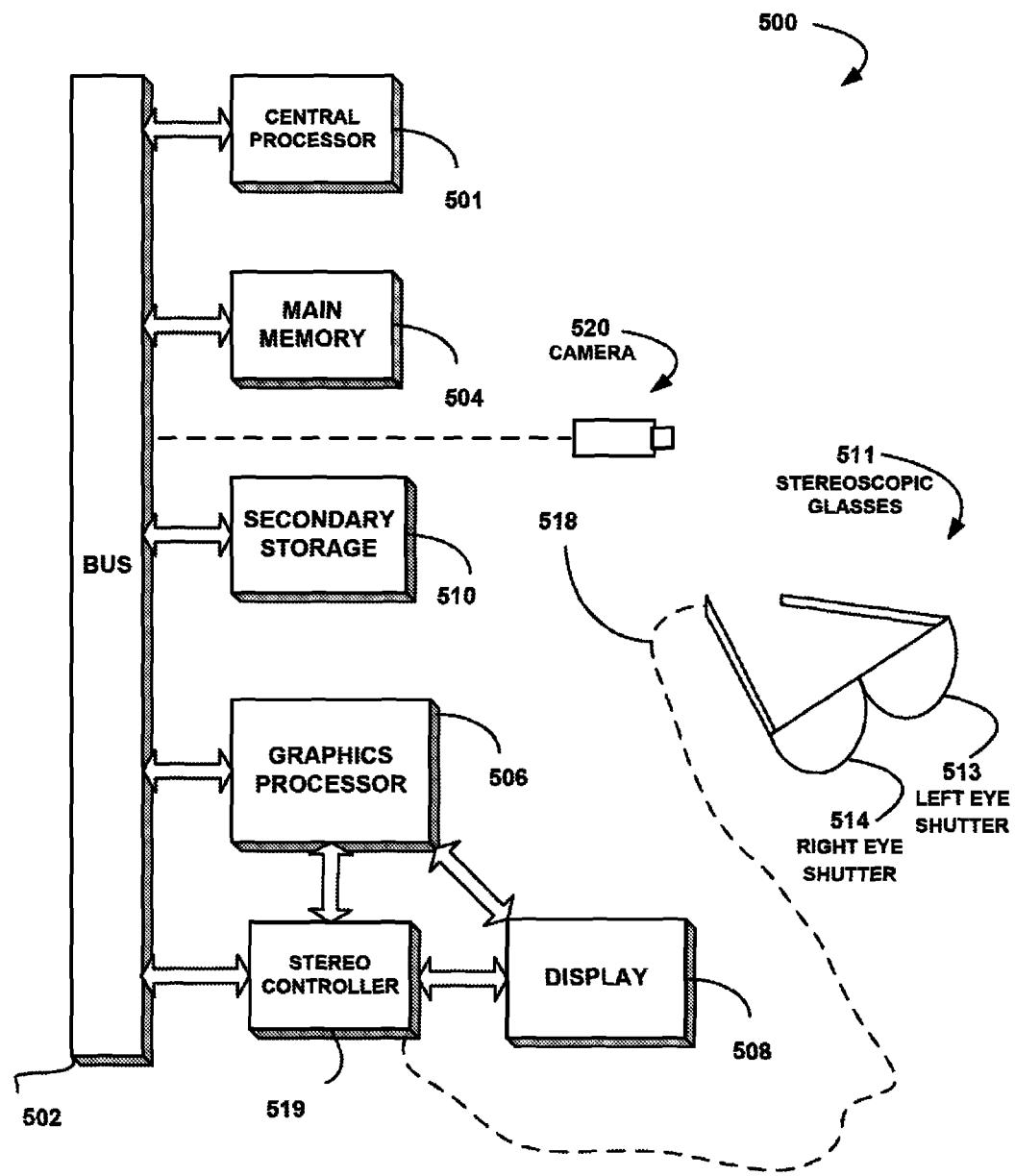
FIG. 5 illustrates an exemplary system in which the various architecture and/or functionality of the various previous embodiments may be implemented.

FIG. 5 illustrates an exemplary computer system 500 in which the various architecture and/or functionality of different embodiments may be implemented. As an option, the computer system 500 may be implemented in the context of the functionality and/or environment of the previous figures. Of course, however, the system computer system 500 may be implemented in any desired environment. Again, the definitions introduced hereinabove apply during the following description.

As shown, a computer system 500 is provided including at least one host processor 501 which is connected to a communication bus 502. The computer system 500 also includes a main memory 504. Control logic (software) and data are stored in the main memory 504 which may take the form of random access memory (RAM).

The computer system 500 also includes a graphics processor 506 and a display 508 in the form of an LCD, DLP display, LCOS display, plasma display, or other similar display. In one embodiment, the graphics processor 504 may include a plurality of shader modules, a rasterization module, etc. Each of the foregoing modules may even be situated on a single semiconductor platform to form a graphics processing unit (GPU). In one embodiment, the shader modules may be programmable for general purpose computation. For example, the shader modules may be programmable for image processing (e.g. in a CUDA™ framework, etc.).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 500 may also include a secondary storage 510. The secondary storage 510 includes, for example a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the computer system 500 to perform various functions. Memory 504, storage 510 and/or any other storage are possible examples of computer-readable media.

Further included is a pair of stereoscopic glasses 511 capable of being worn on a face of a user. The stereoscopic glasses 511 include a right eye shutter 514 and a left eye shutter 513 that are capable of both an open orientation and a closed orientation. In use, the open orientation allows more light to pass than the closed orientation. Of course, such orientations may be achieved by any desired mechanical, electrical, optical (e.g. by way of various polarizations, etc.), and/or any other mechanism capable of carrying out the above functionality.

For control purposes, the stereoscopic glasses 511 may be coupled to a stereo controller 519 via a cable 518 (or without the cable 518 in a wireless environment). The stereo controller 519 is, in turn, coupled between the graphics processor 506 and the display 508 for carrying out the functionality to be set forth hereinabove. In some embodiments (e.g. particularly in the case of wireless stereoscopic glasses, etc.), the right eye shutter 514 and the left eye shutter 513 of the stereoscopic glasses 511 may be controlled utilizing a plurality of signals (e.g. codes, etc.). Of course, separate signals may be used to close only the right eye shutter 514, the left eye shutter 513, etc.

While the stereo controller 519 is shown to reside between the graphics processor 506 and the display 508, it should be noted that the stereo controller 519 may reside in any location associated with the computer system 500, the stereoscopic glasses 511, and/or even in a separate module, particularly (but not necessarily) in an embodiment where the graphics processor 506 is attached to a separate interface (e.g. USB, etc.) on the computer system 500. Still yet, the stereo controller 519 may comprise any hardware and/or software capable of the providing the desired functionality.

Furthermore, as an option, the computer system 500 may include hardware and an input for a head tracking unit. In this case, such hardware may include a camera 520 and a USB input and/or a wireless interface.

In various embodiments, the architecture and/or functionality of the various following figures may be implemented in the context of the host processor 501, graphics processor 506, stereo controller 519, a chipset (i.e. a group of integrated circuits designed to work and sold as a unit for performing related functions, etc.), and/or any other integrated circuit for that matter. Still yet, the architecture and/or functionality of the various following figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. For example, various combinations of user face position and direction detection, 3D stereo rendering, gesture recognition, and auxiliary motion simulation may be implemented to create numerous effects for a wide variety of software applications. Thus, the breadth and scope of a preferred embodiment should not be limited by any of the above-described exemplary embodiments, but should be defined only in accordance with the following claims and their equivalents.

What is claimed is:

1. A method, comprising:
intercepting, by a driver, an application program interface (API) command stream including a plurality of API calls from a three-dimensional graphics application program;
modifying, by the driver, at least one of the plurality of API calls, based on an algorithm that tracks at least a portion of an upper body of a person, by displacing viewpoint data associated with the at least one of the plurality of API calls based on the at least a portion of the upper body of the person tracked utilizing the algorithm;
generating a pushbuffer utilizing the at least one modified API call, and splitting the pushbuffer into a first pushbuffer and a second pushbuffer; and
outputting, from the driver, the at least one modified API call to a graphics processing unit for generating at least one image utilizing the at least one modified API call, wherein the outputting of the at least one modified API call to the graphics processing unit includes communication data in each of the first pushbuffer and the second pushbuffer to the graphics processing unit, without communicating the at least one modified API call back to the three-dimensional graphics application program;
wherein the driver that intercepts the API command stream and the algorithm that tracks the at least a portion of the upper body of the person are separate from the three-dimensional graphics application program, such that the three-dimensional graphics application program is prevented from being aware of the interception and the modification of the at least one modified API call.

2. The method of claim 1, wherein the portion of the upper body includes a head of the person.

3. The method of claim 2, wherein the algorithm tracking the at least a portion of the upper body of the person determines that the head of the person is tilted with respect to a display, and, in response, a first image generated utilizing the at least one modified API call for a first eye of the person is positioned higher than a second image generated utilizing the at least one modified API call for a second eye of the person.

4. The method of claim 1, wherein the portion of the upper body includes at least a portion of a face of the person.

5. The method of claim 1, wherein the plurality of application program interface calls are associated with a standard application program interface.

6. The method of claim 1, wherein the three-dimensional graphics application program operates independent of the algorithm.

7. The method of claim 1, and further comprising processing the at least one modified API call for stereoscopic display.

8. The method of claim 1, wherein the modifying is performed utilizing computer code embodied on a computer readable medium.

9. The method of claim 1, wherein the modifying is performed utilizing hardware.

10. The method of claim 9, wherein the hardware includes the graphics processing unit.

11. The method of claim 1, wherein the modifying includes modifying the at least one of the plurality of API calls at a pushbuffer level.

12. The method of claim 1, wherein the modifying includes modifying the at least one of the plurality of API calls at a processing level defined by the driver.

13. The method of claim 1, wherein the portion of the upper body includes at least one eye of the person.

14. The method of claim 1, wherein the algorithm utilizes input from one or more cameras to track at least one of a head position, a body position, or an eye position of the person.

15. The method of claim 1, wherein the modification of the at least one of the plurality of API calls includes generating two new API calls for one or more different views corresponding to the at least one modified API call.

16. The method of claim 15, wherein the modification of the at least one of the plurality of API, calls generates a first view for a right eye and a second view for a left eye by displacing the viewpoint data associated with the at least one of the plurality of API cabs.

17. The method of claim 1, wherein the modification of the at least one of the plurality of API calls by displacing the viewpoint data includes displacing an original viewpoint specified by the three-dimensional graphics application program with a new viewpoint.

18. The method of claim 1, wherein outputting the at least one modified API call includes communicating the at least one modified API call to an external device for rendering and display of the at least one image, without communicating the at least one modified API call back to the three-dimensional graphics application program.

19. The method of claim 18, wherein the external device to which the at least one modified API call is communicated to is not capable of being used with the API command stream received from the three-dimensional graphics application program.

20. The method of claim 1, wherein the portion of the upper body of the person tracked utilizing the algorithm further includes an eye of the person, such that the algorithm determines a position of the eye of the person.

21. The method of claim 20, wherein the modification of the at least one of the plurality of API calls by displacing the viewpoint data includes:
displacing in one operation the viewpoint data associated with the at least one of the plurality of API calls based on a position of a head of the person, and
displacing in another operation the viewpoint data associated with the at least one of the plurality of API calls based on the position of the eye of the person.

22. A computer program product embodied on a non-transitory computer readable medium, comprising:
computer code for intercepting, by a driver, an application program interface (API) command stream including a plurality of API calls from a three-dimensional graphics application program;
computer code for modifying, by the driver, at least one of the plurality of API calls, based on an algorithm that tracks at least a portion of an upper body of a person, by displacing viewpoint data associated with the at least one of the plurality of API calls based on the at least a portion of the upper body of the person tracked utilizing the algorithm;
computer code for generating a pushbuffer utilizing the at least one modified API call, and splitting the pushbuffer into a first pushbuffer and a second pushbuffer; and
computer code for outputting, from the driver, the at least one modified API call to a graphics processing unit for generating at least one image utilizing the at least one modified API call, wherein the outputting of the at least one modified API call to the graphics processing unit includes communicating data in each of the first pushbuffer and the second pushbuffer to the graphics processing unit, without communicating the at least one modified API call back to the three-dimensional graphics application program;
wherein the computer program product is operable such that the driver that intercepts the API command stream and the algorithm that tracks the at least a portion of the upper body of the person are separate from the three-dimensional graphics application program, such that the three-dimensional graphics application program is prevented from being aware of the interception and the modification of the at least one modified API call.

23. An apparatus, comprising:
an interface included in a driver, the interface for intercepting an application program interface (API) command stream including a plurality of API calls from a three-dimensional graphics application program; and
a processor for:
modifying, utilizing the driver, at least one of the plurality of API calls, based on an algorithm that tracks at least a portion of an upper body of a person, by displacing viewpoint data associated with the at least one of the plurality of API calls based on the at least a portion of the upper body of the person tracked utilizing the algorithm,
generating a pushbuffer utilizing the at least one modified API call, and splitting the pushbuffer into a first pushbuffer and a second pushbuffer, and
outputting, from the driver, the at least one modified API call to a graphics processing unit for generating at least one image utilizing the at least one modified API call, wherein the outputting of the at least one modified API call to the graphics processing unit includes communicating data in each of the first pushbuffer and the second pushbuffer to the graphics processing unit, without communicating the at least one modified API call back to the three-dimensional graphics application program;
wherein the apparatus is operable such that the driver that intercepts the API command stream and the algorithm that tracks the at least a portion of the upper body of the person are separate from the three-dimensional graphics application program, such that the three-dimensional graphics application program is prevented from being aware of the interception and the modification of the at least one modified API call.

24. The apparatus of claim 23, wherein the processor remains in communication with memory and a display via a bus.

* * * * *